(12) United States Patent
Derhak et al.

(10) Patent No.: US 7,573,611 B2
(45) Date of Patent: Aug. 11, 2009

(54) GAMUT MAXIMIZING BLACK GENERATION FOR PRINTERS

(75) Inventors: Maxim Wasyl Derhak, West Jordan, UT (US); Rohit Patil, Salt Lake City, UT (US)

(73) Assignee: Onyx Graphics, Inc., Midvale, UT (US)

( * ) Notice: Subject to any disclaimer, the term of this patent is extended or adjusted under 35 U.S.C. 154(b) by 539 days.

(21) Appl. No.: 11/397,090

(22) Filed: Apr. 4, 2006

(65) Prior Publication Data

US 2007/0229862 A1 Oct. 4, 2007

(51) Int. Cl.
*G03F 3/08* (2006.01)

(52) U.S. Cl. .................. 358/1.9; 358/529; 358/523; 358/524; 345/590

(58) Field of Classification Search .............. 358/500, 358/1.9, 2.1, 3.23, 504, 518, 523, 524, 525, 358/529, 532, 534; 345/581, 589, 590, 591, 345/601, 604, 606
See application file for complete search history.

(56) References Cited

U.S. PATENT DOCUMENTS

| | | | | |
|---|---|---|---|---|
| 4,482,917 A * | 11/1984 | Gaulke et al. ............... 358/518 |
| 4,551,751 A * | 11/1985 | Jung ............................ 358/500 |
| 5,172,223 A * | 12/1992 | Suzuki et al. ................ 358/529 |
| 5,283,671 A * | 2/1994 | Stewart et al. ............... 358/532 |
| 6,259,811 B1 | 7/2001 | Tsuji |
| 6,304,338 B1 * | 10/2001 | Sumiuchi et al. ............. 358/1.9 |
| 6,377,366 B1 | 4/2002 | Usami |
| 7,019,868 B2 * | 3/2006 | Chang et al. .................. 358/2.1 |
| 7,190,487 B2 * | 3/2007 | Dalrymple et al. ........... 358/1.9 |
| 2001/0030757 A1* | 10/2001 | Sumiuchi et al. ............. 358/1.9 |
| 2002/0113982 A1* | 8/2002 | Chang et al. .................. 358/1.9 |
| 2003/0043389 A1 | 3/2003 | Cuciurean-Zapan et al. |
| 2003/0072016 A1* | 4/2003 | Dalrymple et al. ........... 358/1.9 |
| 2004/0114166 A1* | 6/2004 | Kubo .......................... 358/1.9 |
| 2005/0094871 A1 | 5/2005 | Berns et al. |
| 2005/0140997 A1* | 6/2005 | Shirasawa .................... 358/1.9 |
| 2008/0100887 A1* | 5/2008 | Hayase ........................ 358/504 |

* cited by examiner

*Primary Examiner*—Kimberly A Williams
(74) *Attorney, Agent, or Firm*—Workman Nydegger

(57) ABSTRACT

Gamut maximizing black generation for printers. Generating device dependent data from device independent data uses both chromatic curves and achromatic curves, which are independently controllable and which each include a color space curve and a black curve. The achromatic and chromatic curves are generated using a set of input parameters. Once the curves are generated, the final color space values are generated using an interpolation between the achromatic curves and the chromatic curves.

23 Claims, 11 Drawing Sheets

GAMUT MAXIMIZING BLACK GENERATION FOR PRINTERS

CROSS-REFERENCE TO RELATED APPLICATIONS

Not applicable.

BACKGROUND OF THE INVENTION

1. The Field of the Invention

The present invention relates to color management. More particularly, embodiments of the invention relate to systems and methods for performing black generation to maximize color gamut of the device.

2. The Relevant Technology

Color devices such as digital cameras, scanners, monitors and printers are able to produce a wide range of vibrant colors. It is often the case, unfortunately, that the rich color of a digital picture changes when that same image is printed. It may even look different when displayed on a monitor. The primary reason for this change is that each device has a different color gamut and each device often processes colors differently. As a result, a noticeable color shift may occur as the color data from the first device is rendered by the second device.

One of the ways that this problem has been addressed is through the use of color management systems that include, for example, ICC (International Color Consortium) profiles. ICC profiles are used to convert data from a source device to data that is compatible with a destination device. The ICC profile effectively creates a bridge that enables the data to be successfully converted from one color space to another color space. One of the ways that color management systems characterize each device is by creating a relationship between the device color space and a device independent color space such as CIE L*a*b* (LAB).

In a common scenario, data from the color space of an input device is converted to the device independent color space using a forward transform. Next, the data in the device independent color space is converted to the color space of the output device using an inverse transform. For most printing applications, an inverse transform is essential because the data being printed usually originates from a device with a different color gamut.

While the inverse transform may seem to be straightforward, it can be a complex process. In fact, the inverse transform becomes much more complicated when a fourth primary color is added to the mix. For example, RGB (Red, Green, Blue) to CMY (Cyan, Magenta, Yellow) conversions are usually less complicated than RGB or CMY to CMYK (Cyan, Magenta, Yellow, Black) color conversions. The addition of a fourth dimension introduces complications to the color conversion process and in particular to the inverse transform that is required in the color management system.

While CMY primaries are theoretically sufficient to produce all of the desired colors that may be needed, a fourth primary color, which is black (K) in this instance, is often added. Adding K to the printing system has several advantages including improving the dark color region gamut, saving the CMY inks for neutrals which can reduce costs, and the like.

Even though the addition of K has significant advantages, the inverse transform becomes more complicated because the same device independent color can be obtained in numerous ways with CMYK primary inks. However, a unique transform is required in an inverse transform.

Conventional methods for converting CMY to CMYK, however, require a procedure for adding K. For instance, the addition of K has been conventionally achieved using various under color removal (UCR) and gray component replacement (GCR) strategies. A simple UCR solution, for example, is to find the minimum of the CMY primaries and to replace that minimum with black. Other solutions use a function of the CMY minimum to add black and a different function of the CMY minimum for the removal of the gray component from the CMY amounts.

These functions generate one dimensional look-up tables or curves called GCR or UCR curves. The drawback to these solutions is that they restrict the gamut too much or introduce unwanted black in light regions of the gamut. The presence of black dots, for example, can draw unwanted attention and detract from the smoothness of the printed image. Systems and methods are needed for black generation to maximize the gamut while using CMYK primaries, but which do not reduce the quality of the printed image.

BRIEF SUMMARY OF THE INVENTION

These and other limitations are overcome by embodiments of the invention, which relate to black generation. Embodiments of the invention further relate to an inverse transform that provides black generation as data represented in a device independent color space is transformed to a device dependent color space.

The conversion of color data from a device independent space to a device dependent space is achieved using an inverse transform. Before performing the transform, a set of input parameters can be selected, by design or by default. The input parameters are used in the generation of achromatic curves and chromatic curves. The input parameters include a start K value that determines when black begins to be added, a maximum K value that determines the maximum amount of black that may be added, and a curve type, that determines, in one embodiment, a rate of addition for the black ink. Usually, the curve type for the K curves is inversely related to the curve types of the CMY curves.

After identifying an input value, an achromatic and a chromatic value are identified. This may include a minimum and/or a maximum color value of the input value. Then, an output value in the device dependent color space is determined by interpolating the achromatic value and the chromatic values using the previously established curves.

The resulting output value includes a black generation that maximizes the gamut of the device and also provides a unique transform for each unique input value. Advantageously, the input parameters enable a user to set them to conserve comparatively more expensive CMY inks, provide richer dark region gamut colors, and the like.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for black generation in devices including printing devices. Embodiments of the invention further relate to systems and methods for converting a first color space to a second color space such that the available color gamut of a device or the available device gamut is maximized. Inverse transforms, in particular, require the conversion of device independent color data to device dependent color data. Color spaces are discussed in terms of the CMY (Cyan, Magenta, Yellow) and CMYK (Cyan, Magenta, Yellow, Black) color spaces, but one of skill in the art can appreciate that embodiments of the invention can be applied to the conversion of one color space to another color space.

Figure 1:
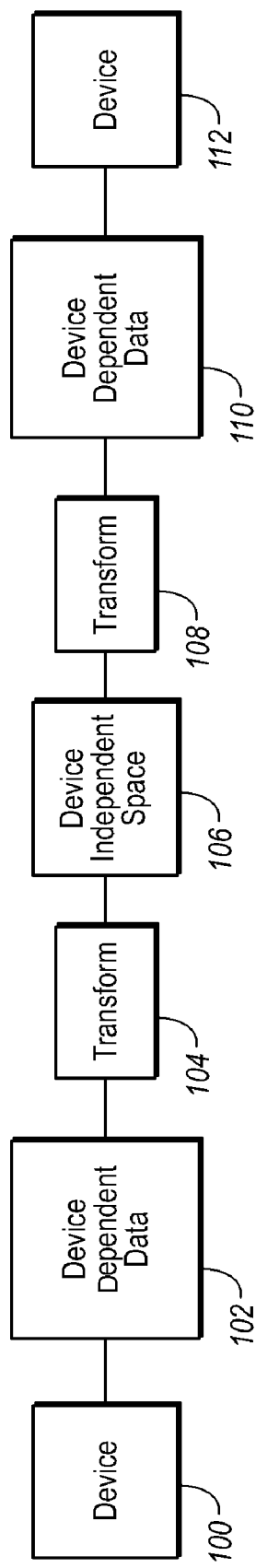
FIG. 1 illustrates an exemplary system for implementing embodiments of the invention.

FIG. 1 is a block diagram illustrating part of a color management process. This part of the color management process often begins by receiving device dependent data 102 from a device 100 or from another source. Often, the device dependent data 102 is in a particular format and in a particular color space. Because the data 102 is device dependent, it is not in an appropriate form for use by a different device 112. As previously stated, the color gamut of the device 112 is different from the color gamut of the device 100. This may also be the case even when the device 100 and the device 112 use the same color space because the gamut of one device may differ from the gamut of another device.

The data 102 undergoes a forward transform 104 such that the data 102 is represented in a device independent space 106. One example of the device independent space is CIEL*a*b* (CIELAB or LAB). CIELAB is a conventional representation of colors visible to the human eye. Using CIELAB, the device dependent data 102 can undergo a forward transform 104 from a first color space to CIELAB and then undergo another inverse transform 108 from CIELAB to a second color space to obtain the device dependent data 110, which can be rendered by the device 112.

For example, the device 100 may be a digital camera operating in the RGB color space and the device 112 may be a printer that includes CMY or CMYK inks. Because the RGB color space of the device 100 is dependent on the device 100, the data 102 is not compatible with the device 112. Without the necessary conversions or transforms from one color space to another space, the resulting image from the device 112 would be of very poor quality.

Figure 2:
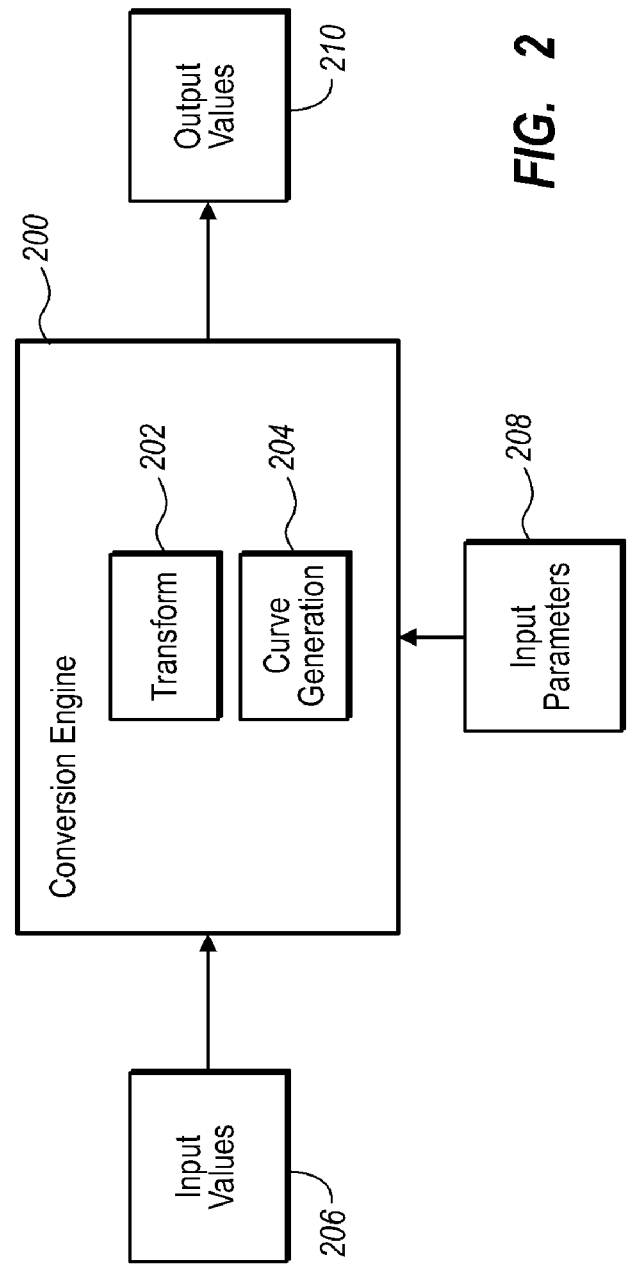
FIG. 2 illustrates one embodiment of a conversion engine that uses variable input parameters to generate curves used in black generation.

With reference to FIG. 2, embodiments of the invention include a conversion engine 200 that performs a CIELAB to CMYK (or other color space) conversion using a transform 202. FIG. 2 focuses on the inverse transform and as a result, the forward transform from device dependent color data to device independent color data has already been performed. In this example, the input data 206 is therefore in the CIELAB color space, and is transformed to output data 210 in the appropriate color space such as CMYK. In one embodiment, the output data 210 is data that can be rendered by a printer such as a CMYK printer. The transform 202 can convert the input values 206 to output values 210 that correspond to the gamut of a printing device.

The conversion engine 200 is typically initialized using input parameters 208. The input parameters 208 includes a set of parameters for chromatic regions and a set of parameters for achromatic regions of the relevant color space associated with the output values 210. The input parameters 208, for both the chromatic and achromatic regions, include, but are not limited to, a type of curve, a start black value, and a maximum black value.

The curve type defines the rate of black addition and/or the removal of gray component in both the chromatic and achromatic regions. The start black (or start K) value identifies the value at which black is added and the maximum black (or maximum K) value defines the maximum amount of black to be added. The start K value and the maximum K value, in one embodiment, identify where and/or how black generation occurs or corresponds to areas where black is added. Advantageously, the addition of black or K improves the dark color region gamut, saves more expensive CMY inks for neutral regions of the device gamut, and the like.

The sets of input parameters 208, which can be provided or set by a user, define the shapes of the CMY and K curves for both the achromatic and chromatic regions. The values of the input parameters 208 are not fixed and can be changed. Further, the input parameters 208 are not necessarily dependent on the input values 206. For given input values 206, more than one set of input parameters 208 can be selected. Embodiments of the invention control these curves independently for the chromatic and achromatic regions and control the interpolation for the values in between. This provides the end user with great flexibility when printing data and enables the user to maximize the gamut of the device.

Figure 4:
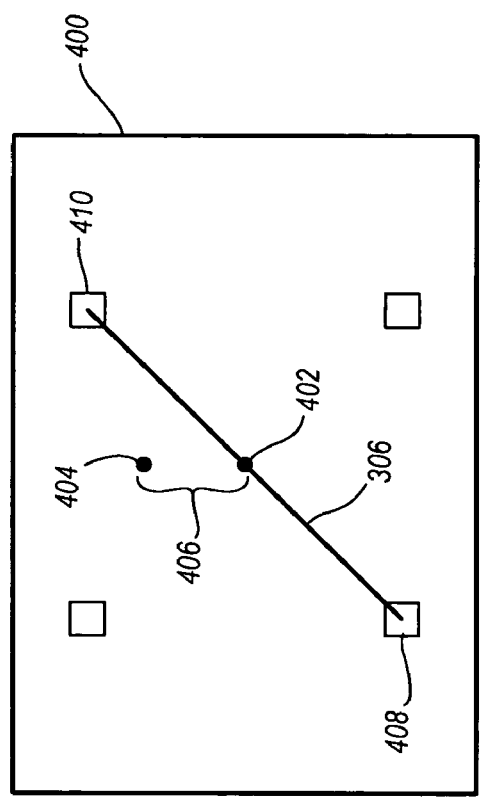
FIG. 4 illustrates a portion of the color space shown in FIG. 3 including the achromatic region.
Figure 3:
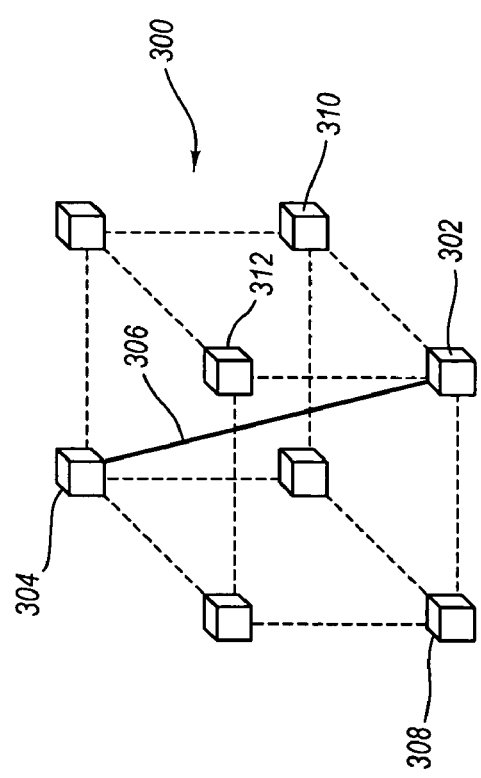
FIG. 3 is one example of a color space including chromatic regions and achromatic regions.

Before discussing the generation of the curves for the achromatic regions and the chromatic regions, FIGS. 3 and 4 are illustrations of the device gamut that are used in describing the curve generation and black generation. FIG. 3 illustrates a color cube or space 300. The block 302 represents white or no color and the block 304 corresponds to black. The diagonal line 306 thus corresponds to the achromatic region of the color space 300. The blocks 308, 312, and 310 represent cyan, yellow, and magenta regions.

FIG. 4 is a cross section of the color space 300 that includes the achromatic region 306. The block 408 again represents white and the block 410 represents black. Each point in the color space 300 or 400 can be represented as a CMY triad with coordinates (C,M,Y). The coordinates in the CMY triad range, by way of example and not limitation, from 0 to 100, where 100 represents maximum saturation. By way of example and not limitation, the maximum saturation can be based on the color gamut of the device, the media quality used in a printing device, the available inks in the printing device, the color gamut of the device that generated the color data, and the like or any combination thereof.

Thus, CMY (0, 0, 0) is white and CMY (100, 100, 100) is black. The point 404, in this example, may correspond to the $CMY_{point}$ (55, 55, 80). The $CMY_{min}$ value in this case is 55 as indicated by the coordinates of the $CMY_{point}$ 402. The minimum of the $CMY_{point}$ 402 corresponds to the gray component of the point 404 or to the achromatic portion of the point 404. The distance 406 represents the chroma in terms of saturation. The point 404 can have chroma in one or more of cyan, magenta, and/or yellow. The CMY triads can be used in the generation of final CMYK values as discussed below. For example, the process of transforming device independent data to the CMYK color space may also include, in one embodiment, an intermediary transform to the CMY color space.

Generation of Chromatic and Achromatic Curves for the Generation of CMYK Values

Figure 5A:
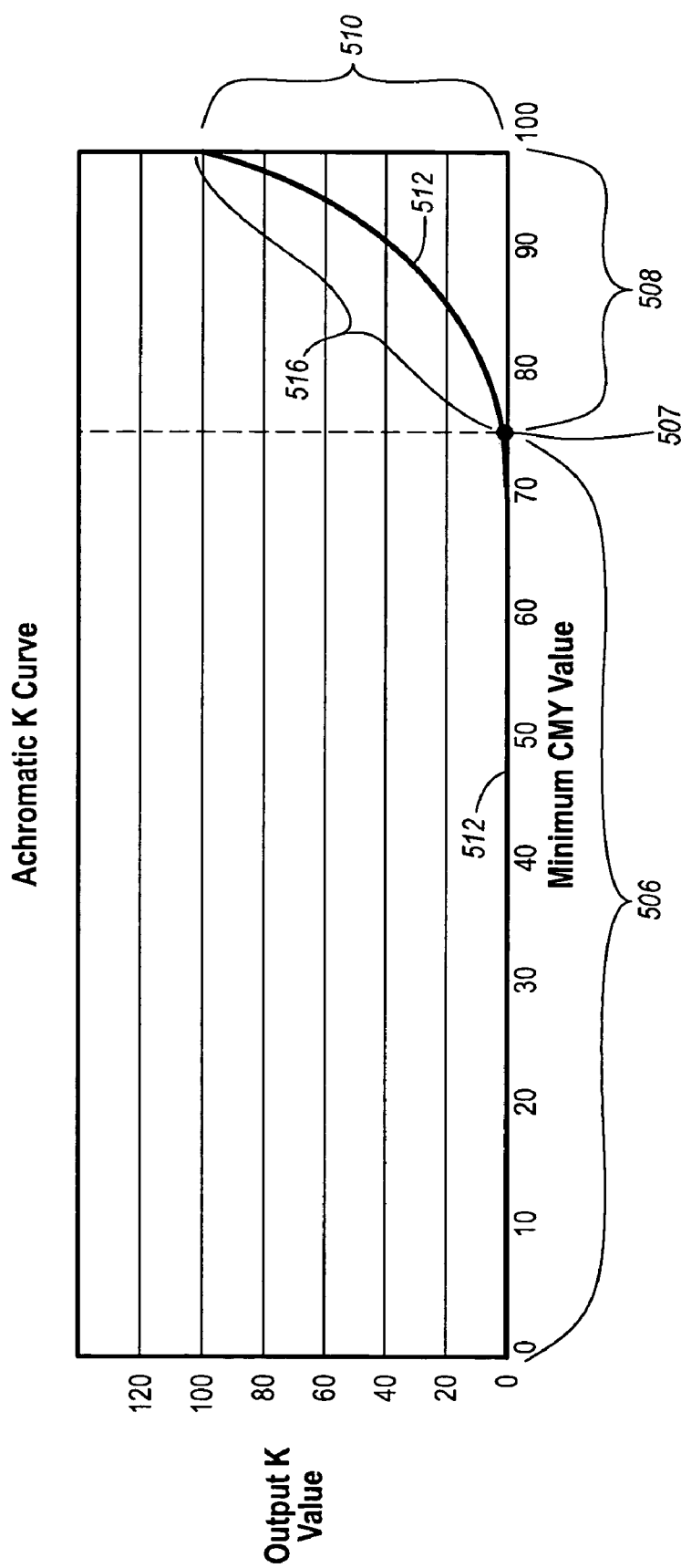
FIG. 5A is an exemplary plot of an achromatic K curve.
Figure 5B:
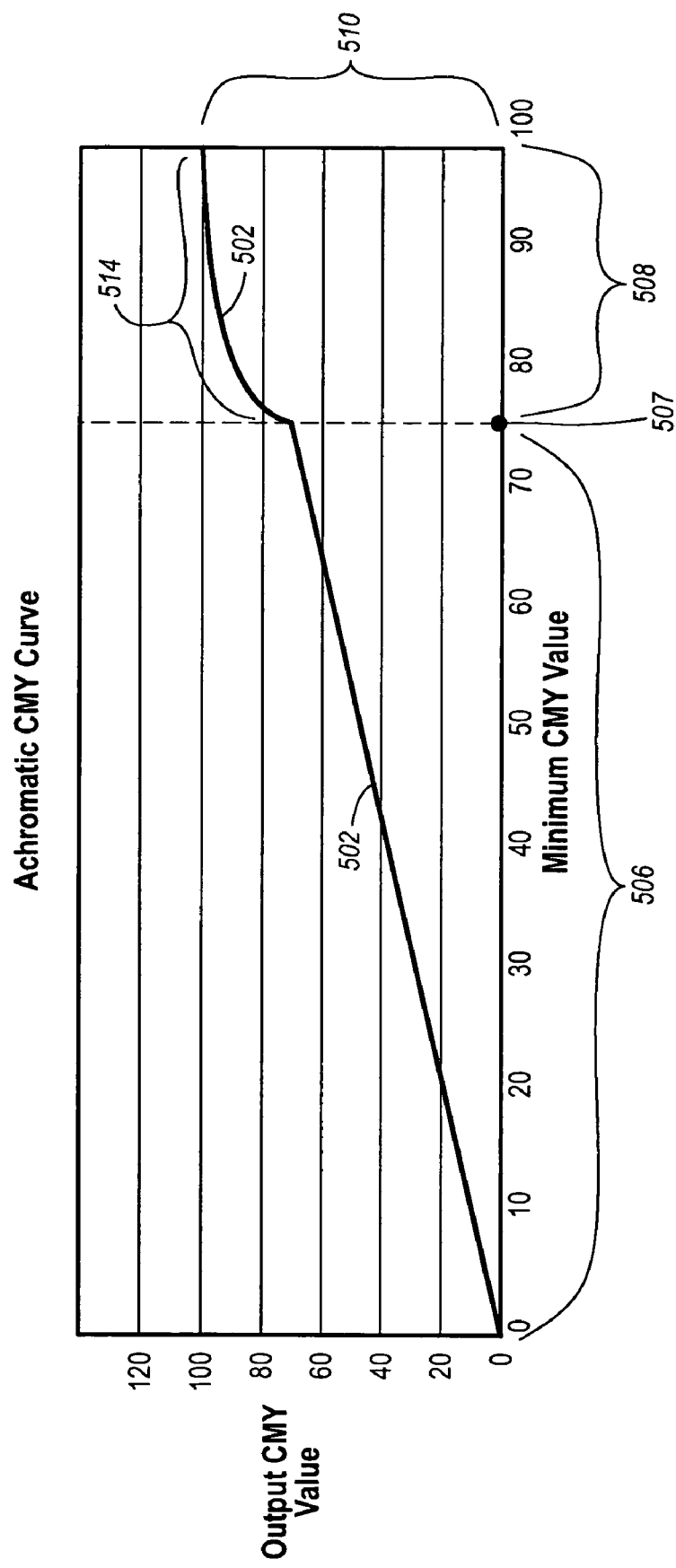
FIG. 5B is an exemplary plot of an achromatic CMY curve.
Figure 6A:
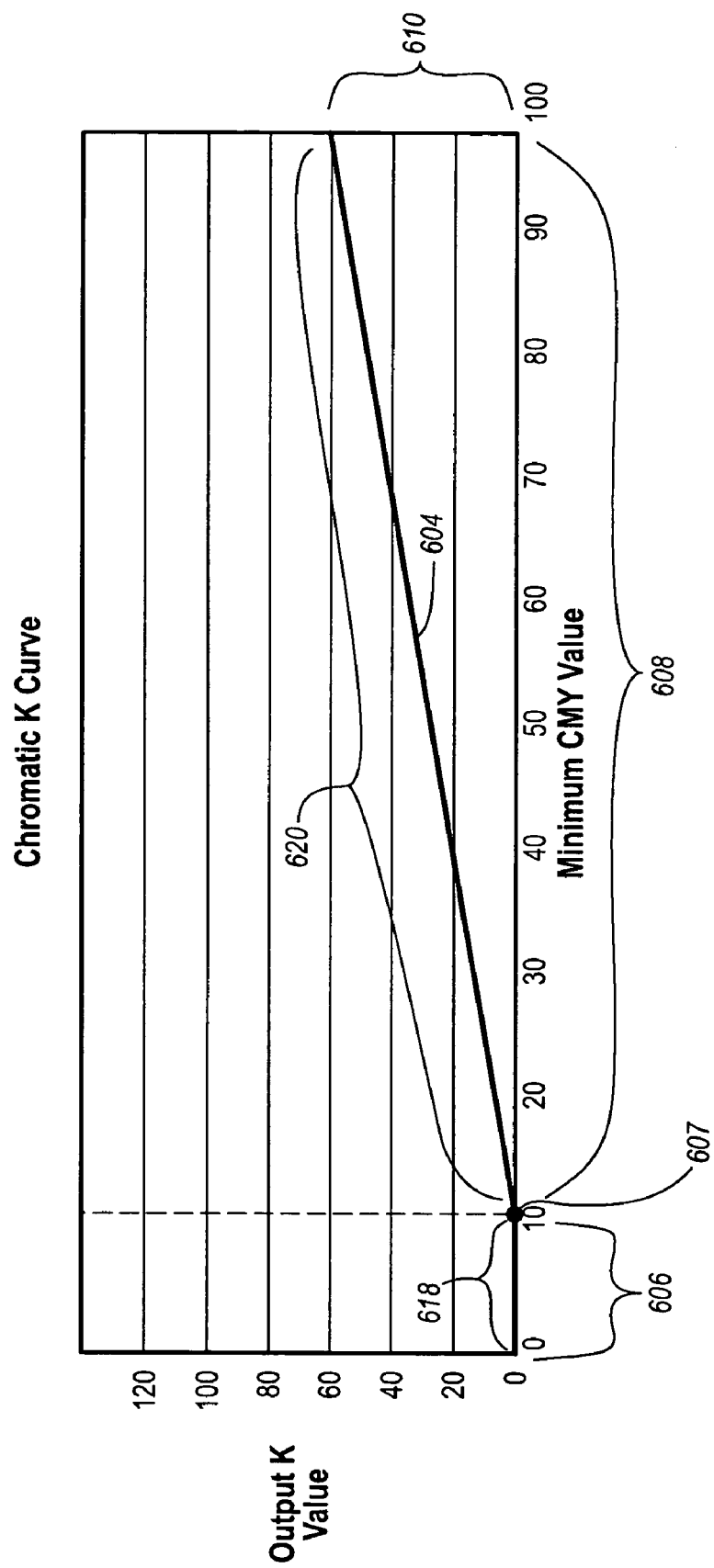
FIG. 6A is an exemplary plot of a chromatic K curve.
Figure 6B:
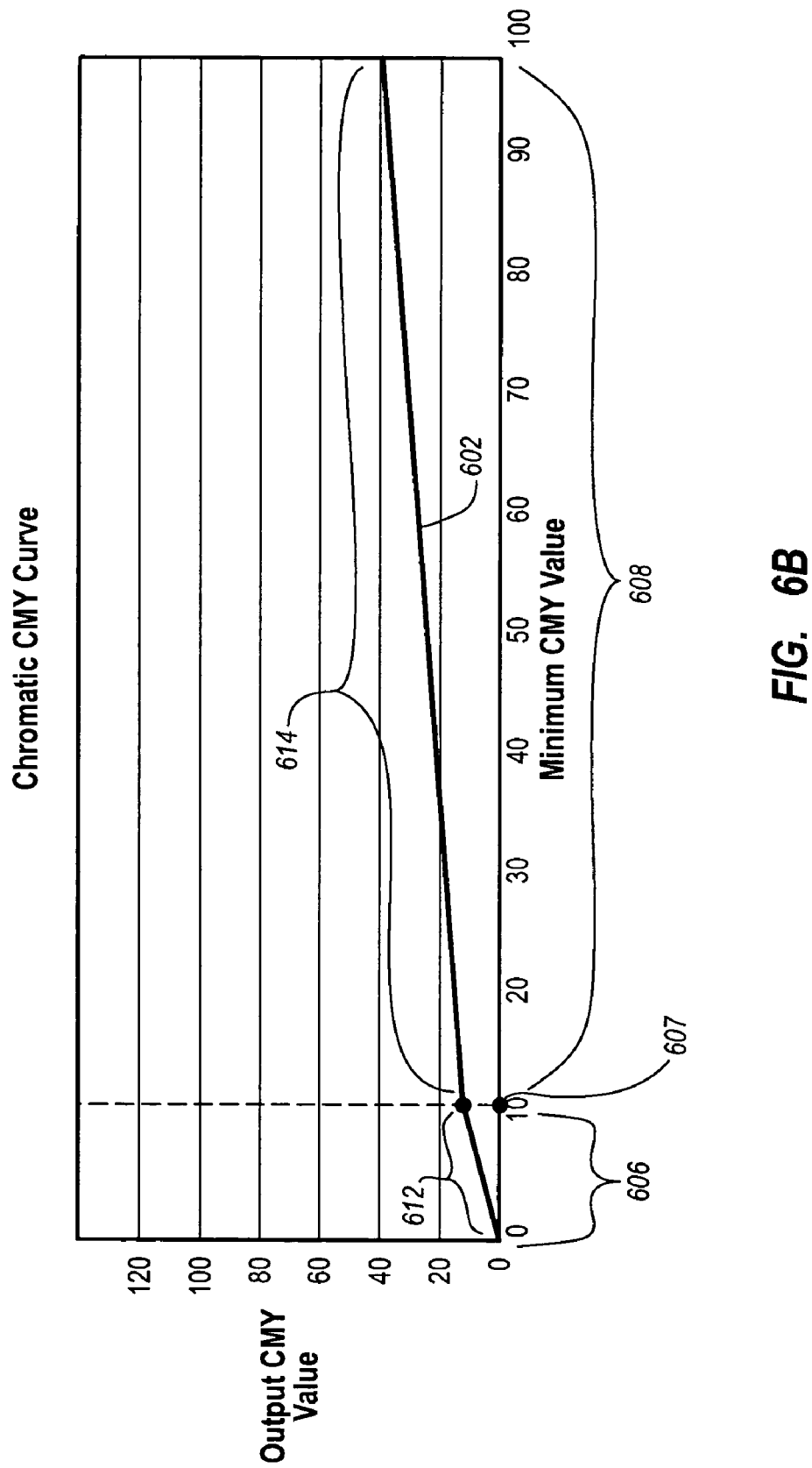
FIG. 6B is an exemplary plot of a chromatic CMY curve that is related to the chromatic K curve illustrated in FIG. 6A.

FIGS. 5A and 5B illustrate the generation of achromatic curves. FIG. 5A illustrates one embodiment of an achromatic K curve 512 and FIG. 5B illustrates one embodiment of an achromatic CMY curve 502. FIGS. 6A and 6B illustrate the generation of the chromatic curves including the chromatic K curve 604 in FIG. 6A and the chromatic CMY curve 602 in FIG. 6B.

In one embodiment, the chromatic curves suggest that the CMY is used to express increased chroma rather that using CMY for gray. One embodiment of the achromatic curves, on the other hand, is directed to obtaining the gray output by mixing CMY and K, which can allow for a smoother appearance in the resulting printed image.

The exemplary curves illustrated in FIGS. 5A through 6B are used in the generation of the final CMYK values from the input values. Embodiments of invention maximize the gamut of the printing device and allow control over addition of black in both the chromatic region and in the achromatic region of the gamut separately. Thus, while some portions of the achromatic region of a color space can be rendered using K, the input parameters may cause certain portions to be rendered using CMY values only, K values only, and/or CMYK values. The final CMYK values are generated, in one embodiment, with an interpolation between the achromatic and chromatic curves.

The conversion engine 200 is initialized and generates the chromatic curves and the achromatic curves using two sets of parameters (e.g., curve type, start black, maximum black for each of the achromatic curve and the chromatic curve) as previously described. Alternatively, a single set of input parameters can be used for the generation of both the chromatic and achromatic curves. Each of the parameters can be defined, set, or changed by a user. Further, the achromatic curves can be controlled independently of the chromatic curves. Thus, the input parameters selected for the achromatic curves can differ from the input parameters selected for the chromatic curves.

For the curve type parameter, the type of the curve defines the rate of black addition and the removal of gray component. The curve type is often defined by a power function, which can be linear. In one embodiment, the curve type is realized using a power function increasing the exponent to reduce the initial rate of black addition.

The start black parameter is the value at which black begins to be added. The maximum black parameter is the maximum amount of black to be added. Thus, the black curve, in both the achromatic and chromatic curves has an output value of 0 until the start black value is reached. The power function associated with the curve type typically begins at the point identified by the start black parameter and therefore has a range of 0 to the maximum black value. FIGS. 5A, 5B, 6A and 6B illustrate examples of these parameters and examples of achromatic curves and chromatic curves.

With reference to the achromatic curves, FIGS. 5A and 5B illustrate the impact of the set of input parameters. The achromatic CMY curve and the achromatic K curve are divided into two regions: a start K region 506 and a K generation region 508. No black is added in the start K region 506 because the CMY values are below the start K value. Rather, black generation begins at the start K value 507, which determines when K begins to be added. As previously stated, the start K value 507 can vary and is often determined by a user of a printing device.

FIG. 5A illustrates the achromatic K curve 512. In this embodiment, the achromatic K curve 512 is zero until the start K value 507 is reached. The start K value 507 is about 75 in this example. The K generation region 508 of the curve 512 is then defined by the curve type and the maximum K input parameters. In this example, the K generation region 508 of the achromatic K curve 512 uses a power value such that the output value is within the range of 0 to the maximum K in the K generation region 508 of the achromatic K curve 512.

With reference to FIG. 5B, the K generation region 508 of the achromatic CMY curve 502 has an inverse power relationship to the K generation region 508 of the achromatic K curve 512. FIGS. 5A and 5B illustrate this relationship, which is particularly evident in the K generation region 508. In this example, the rate of K addition increases in the K generation region 508 as the rate of the CMY addition decreases. More particularly, the rate of addition reflected in the portion 514 of the achromatic CMY curve 502 decreases as the rate of addition reflected in the K generation region 508 of the achromatic K curve 512 increases. The maximum K 510 illustrates the maximum K to be added.

In this case, however, the CMY continues to be added rather than removed, which allows for richer four color neutrals. Further, the start K value and the maximum K value can be set at any point desired and the curve type can also be any desired curve type. The achromatic CMY curve 502 and the achromatic K curve 512 can be custom defined using these input parameters. The relationship between the two curves, and more particularly the relationship between the portions 514 and 516 in the black generation region 508 is preferably maintained. In one embodiment, for example, the curve type associated with the portion 514 of the achromatic CMY curve 502 in the K generation region 508 has an inverse relationship with the curve type associated with the portion 516 of the achromatic K curve 502.

FIGS. 6A and 6B illustrate exemplary chromatic curves. The chromatic curves illustrated in FIGS. 6A and 6B are generated in substantially the same manner as the achromatic curves illustrated in FIGS. 5A and 5B. The portion 618 of the chromatic K curve 604 in FIG. 6A has a value of zero in the start K region 606 or up until the start K value 607, which is about 10 in this example. The portion 620 of the curve 604 in the K generation region 608, which begins at the start K value 607, has a power function within the range of 0 to the maximum K value. The power function in this example is linear in nature.

As illustrated in FIG. 6B, the chromatic CMY curve 602 also has two parts. The portion 612 in the start K region 606 of the chromatic CMY curve is linear because no K is being added as the start K value has not been reached. The portion 614 of the chromatic CMY curve 602 in the K generation region 608 begins at the start K value and is defined by the curve type and the maximum K value 610.

More particularly, the maximum CMY colorant amount allowed is defined by the maximum allowed colorant amount less the maximum K. Thus, as the maximum K value increases, the maximum CMY decreases and vice versa. By way of example and not limitation, the maximum K value in this example is about 60, as illustrated by the maximum K value 610. As a result, the maximum allowed colorant is about 40. In other words, the output values identified in the curves shown in FIGS. 6A and 6B show that the total output value does not usually exceed the maximum output value, which is 100 in this example. Thus, the maximum output value of the chromatic K curve 604 is about 60 and the maximum output value of the chromatic CMY curve is about 40. Together, the maximum output of the chromatic curves is therefore at 100.

The curve type of the chromatic CMY curve 602 is preferably related to the curve type of the chromatic K curve 604. For example, if the maximum CMY value is greater than the start K value, then the power of the K generation portion of the chromatic CMY curve, in this example, is: (1+(power of the K generation portion of the chromatic K curve−1)*(Maximum K value/100)) (* indicates multiplication). This power is inverted, in one embodiment, if the maximum CMY value is less than the start K value.

The final chromatic CMY output value is (Start K+(1−the power applied to the normalized input value between start K and the maximum CMY with the exponent calculated above) *(100−Start K−Maximum K)).

With reference to FIG. 6A, the maximum K is 60. Thus, the maximum CMY output value is 40. In this example, the power is linear, but other power values or functions can be used. The chromatic K and CMY curves can be customized, but the relationships described above are preferably maintained.

Figure 6C:
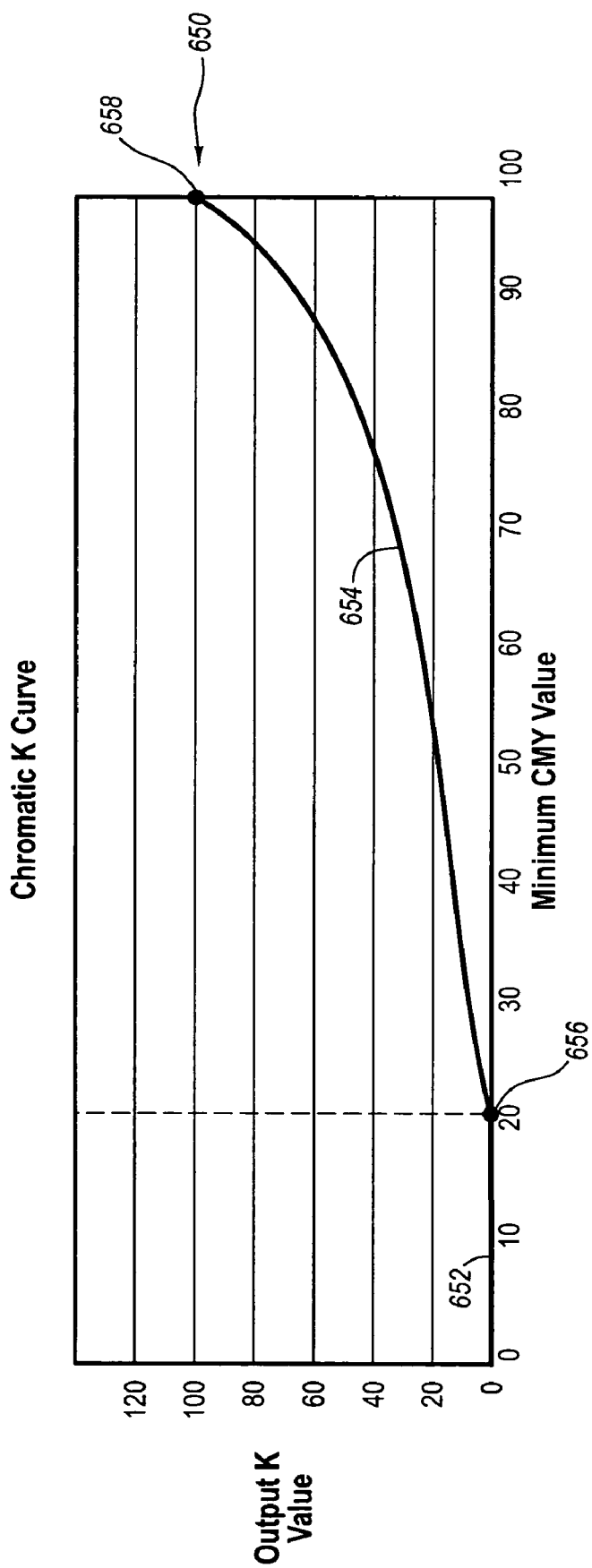
FIG. 6C is another exemplary plot of a chromatic K curve.
Figure 6D:
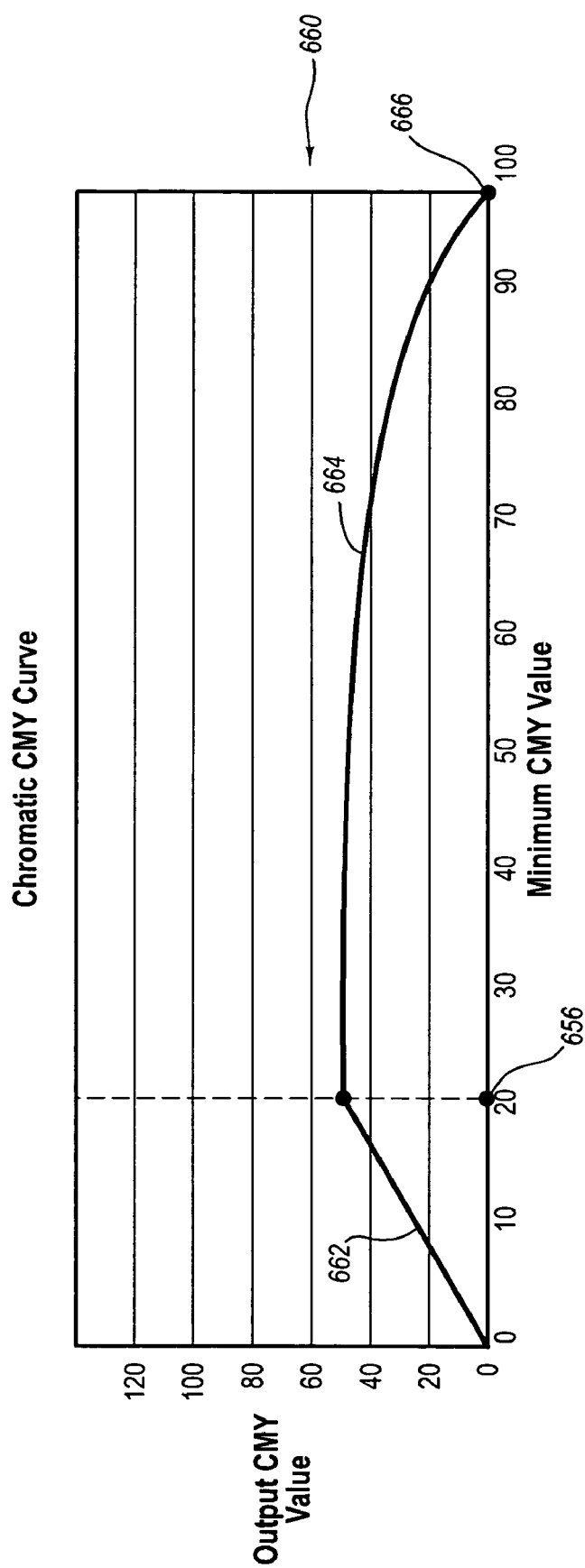
FIG. 6D is an exemplary plot of a chromatic CMY curve that is related to the chromatic K curve illustrated in FIG. 6C.

FIGS. 6C and 6D illustrate another embodiment of a chromatic K curve and associated chromatic CMY curve. In this example, the start K value 656 is about 20 and the maximum K value is 100. Because the maximum K value is 100, the maximum allowed colorant ultimately decreases to 0 as the added K approaches 100.

FIG. 6C illustrates the chromatic K curve 650 with a K start portion 652 and a K generation portion 654. In this example, the portion 654 has a power that increases exponentially from 0 at the start K value 656 to the maximum K value 658. The corresponding CMY curve 660 shown in FIG. 6D has a linear portion 662. The portion 662 of the curve 660 is linear because the start K value 656 has not yet been reached. From the start K value and during the K generation region of the chromatic CMY curve, the portion 664 of the curve 660 has a curve type that decreases to the end value 666. The relationship between the curve types of the portion 664 of the chromatic CMY curve 660 and the portion 654 of the chromatic K curve 650 is thus maintained.

Figure 6E:
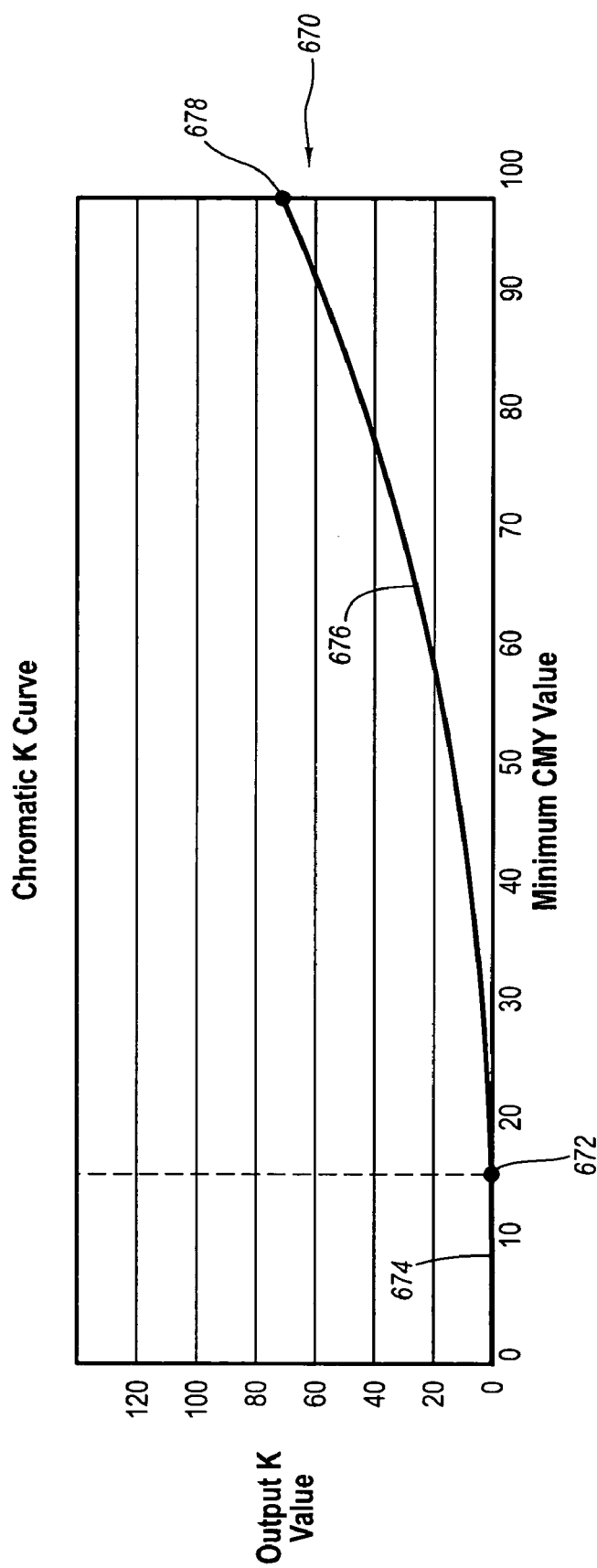
FIG. 6E is another exemplary plot of a chromatic K curve.
Figure 6F:
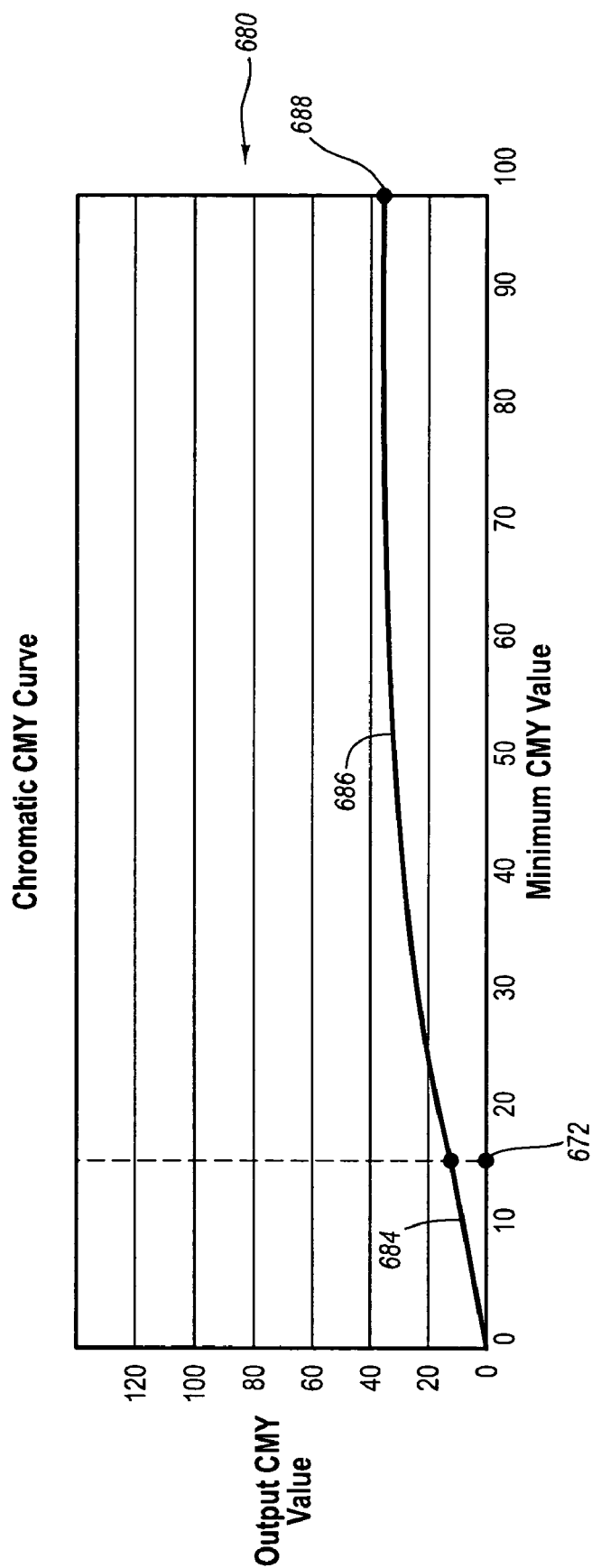
FIG. 6F is an exemplary plot of a chromatic CMY curve that is related to the chromatic K curve illustrated in FIG. 6E.

FIGS. 6E and 6F illustrate another embodiment of the chromatic curves. FIG. 6E illustrates a chromatic K curve 670. In this example, the portion 674 in the start K region has a value of zero up to the start K value 672. After the start K value 672, the chromatic K curve 670 begins to increase according to a defined curve type up to the maximum black value 678, which is about 70 in this example.

In FIG. 6F, the portion 684 of the chromatic CMY curve 680 is linear in the start K region up to the start K value 672. The portion 686 of the curve 680 in the K generation region has a curve type that is related to the curve type of the portion 676 of the chromatic K curve 670. The portion 686 thus increases to the maximum colorant value of about 30 in this example.

Determination of CMYK Values using the Generated Curves

The output values from these achromatic and chromatic curves are not the final CMYK values. An interpolation between these curves is used to determine the final CMYK values.

Once the conversion engine is initialized, the conversion of a CMY triad (e.g. (cyan, magenta, yellow) or CMY (cyan value, magenta value, yellow values)) is converted or transformed. The following discussion illustrates embodiments for determining the final CMYK values.

The following discussion illustrates one embodiment of a method for transforming data from a device independent color space to a device dependent color space and more particularly for generating a CMYK values from input values in another color space.

The system begins with a CMY value. The CMY value may be initially derived from the device independent data. This example uses the CMY value in the process of generating final CMYK values. The minimum and maximum values of the CMY triad ($CMY_{min}$ and $CMY_{max}$) are identified or computed. This can be done by looking at the CMY triad itself in one example. For instance, the $CMY_{min}$ of CMY (25, 45, 60) is 25 or CMY (25, 25, 25) and the $CMY_{max}$ is 60. Another way of representing the $CMY_{min}$ is as follows:

$$G=\min(CMY)=CMY_{min}.$$

Next, the chromatic CMY value or $CMY_{chr}$ value is determined by subtracting the minimum value from each of the values in the CMY triad.

$$CMY_{chr}=CMY-CMY_{min}$$

or $$CMY_{chr}=CMY-G.$$

Next, an intermediate saturation (SAT) is determined. The intermediate saturation is defined as:

$$SAT=(CMY_{max}-CMY_{min})/(MAX_a-CMY_{min})$$

or $$SAT=(CMY_{max}-CMY_{min})/(100-G)$$

where $MAX_a$ is the maximum allowable colorant amount.

The SAT value identifies the distance from the neutral region in terms of saturation. A saturation value of 0, for example, indicates an achromatic value or color while a value of 1 indicates chromatic color. With reference to FIG. 4, the SAT value identifies the distance of the point 404 from the point 402 in terms of saturation.

Next, the chromatic component $CMY_{chr}$ is rescaled as $CMY_{new}$ so that the CMY values new range from zero to the maximum colorant amount.

$$CMY_{new}=(CMY_{chr}*MAX_a)/(MAX_a-CMY_{min}).$$

The final CMY values, $CMY_{final}$, are determined by an interpolation between the output from the chromatic CMY curves and the achromatic CMY curves. The $CMY_{min}$ is used to look up an output value from each of these curves. Once these output values are identified from the chromatic CMY curves and the achromatic CMY curves, the SAT value is used for interpolation.

The SAT value is a saturation distance from the neutral region and the term (1−SAT) is the saturation distance from the chromatic region. The chromatic CMY grey value ($CMY_c$) and the achromatic CMY grey value ($CMY_a$) can be thought of as functions of G and are identified from the chromatic CMY curve and the achromatic CMY curve. The interpolated CMY grey value ($CMY_i$) is determined, in one embodiment, as follows:

$$CMY_i = (1-SAT)*CMY_a(G) + SAT*CMY_c(G).$$

The $CMY_i$ grey value now needs to be added back into the $CMY_{new}$ chromatic portion. Optionally, the $CMY_i$ can be balanced using the $CMY_i$ data and device independent color data. Before doing this $CMY_{new}$ is rescaled using the following equation to avoid going above $MAX_a$ when $CMY_i$ is added back in.

$$CMY_{scaled} = CMY_{new}*(MAX_a - CMY_i)/MAX_a$$

Alternatively, the $CMY_{scaled}$ value can be computed using the balanced value.

The $CMY_{final}$ value is then determined as $$CMY_{final} = (CMY_{scaled} + CMY_i).$$

The chromatic K value ($K_c$) and the achromatic K value ($K_a$) can also be thought of as functions of G and are identified from the chromatic K curve and the achromatic K curve. The final K value ($K_{final}$) is the interpolation of $K_c$ and $K_a$ as described above for CMY.

$$K_{final} = (1-SAT)*K_a(G) + SAT*K_c(G)$$

Note that the actual values obtained from accessing the various values from the achromatic and chromatic curves can vary and depend on the input parameters of start K, maximum K, and curve type.

Figure 7:
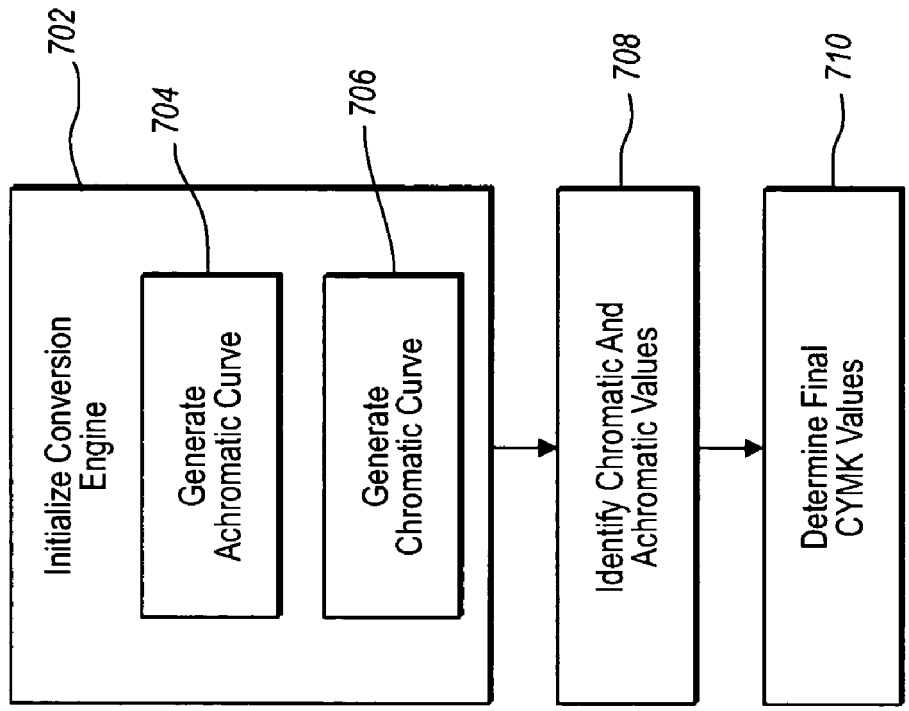
FIG. 7 is a flow diagram illustrating an exemplary method of black generation for a printing device.

FIG. 7 illustrates an exemplary method for black generation in printing devices. In one embodiment, the black generation includes generating the black component of CMYK when converting from another color space such as LAB or CMY. This process is typically performed as part of an inverse transform and embodiments of the invention provide, in one embodiment, that the amount of black added to the initial CMY primaries is controlled independently for achromatic colors and for chromatic colors of the gamut of the device. Further, in one example, the conversion engine ensures that a unique transform is achieved for each color that is transformed from CMY to CMYK or from one color space to another color space.

When converting from a device independent space to a device dependent space (such as from LAB to CMYK), the LAB values may first be converted to CMY values, which are then provided to the conversion engine. The conversion engine is initialized 702, which can include the generation of the achromatic curves 704 and the chromatic curves 704. These curves are generated using a set of input parameters for each of the achromatic curves and the chromatic curves. The curve type, the start K and the maximum K are examples of input parameters. In one embodiment, the achromatic curve types have inversely related power functions. The chromatic curve types are also related. For instance, the maximum CMY is determined by the maximum colorant less the maximum K value in one example.

After initializing the conversion engine, the chromatic and achromatic values are identified 708. Identifying the chromatic and achromatic values, which is previously described, includes identifying the minimum and maximum values of the CMY triad and computing an intermediate saturation value. Once the saturation value is determined, the chromatic component is included in the CMY values to determine the new achromatic and chromatic CMY values.

Next, the final CMYK values are determined 710 by accessing the chromatic and achromatic curves based on the new CMY values and then interpolating both the CMY values and the K values using the chromatic and achromatic curves.

In another embodiment, identifying chromatic and achromatic values begins by identifying a maximum and/or a minimum CMY value. A chromatic CMY value is then determined by subtracting out the minimum CMY value. A saturation value (SAT) is next determined. The saturation value is indicative of the chroma from the neutral region. The saturation value can be determined as a difference between the maximum and minimum CMY values relative to the difference between the maximum allowed colorant and the CMY minimum value.

Identifying the chromatic and achromatic values continues by rescaling the chromatic CMY value. The new CMY value can then range from zero the maximum allowed colorant. Next, output values from the achromatic and chromatic curves are identified using the minimum CMY values. An interpolated CMY value is then generated by applying the scaled saturation value to the output values from the achromatic and chromatic curves.

Identifying the chromatic and achromatic values then continues by combining the scaled CMY value with the interpolated CMY value. The chromatic and achromatic K values are similarly determined.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computing system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating black to maximize a gamut of a printing device, the method comprising:
   receiving a set of input parameters that define (i) achromatic curves to control an addition of black and setting of an achromatic gray value in an achromatic region of the gamut and (ii) chromatic curves that control an addition of black and setting of a chromatic gray value in the chromatic region, wherein the addition of black and setting of the gray value in the achromatic region is controlled separately from the addition of black and setting of the gray value in the chromatic region;
   for a given input value in a color space, identifying an achromatic value and a chromatic value;
   determining an output value for the input value by interpolating the output value from the achromatic value, the chromatic value, the achromatic curves and the chromatic curves.

2. The method of claim 1, wherein the achromatic gray value comprises an achromatic CMY gray value, wherein receiving a set of input parameters further comprises receiving a first set of input parameters for the achromatic curves, the achromatic curves including an achromatic CMY gray value curve and an achromatic K curve.

3. The method of claim 2, wherein the chromatic gray value comprises a chromatic CMY gray value, and wherein receiving a set of input parameters further comprises receiving a second set of input parameters for the chromatic curves, the chromatic curves including a chromatic CMY gray value curve and a chromatic K curve.

4. The method of claim 2, wherein the second set of input parameters comprises a curve type, a start black value and a maximum black value.

5. The method of claim 1, wherein the first set of input parameters comprises a curve type, a start black value and a maximum black value.

6. The method of claim 1, wherein identifying an achromatic value and a chromatic value further comprises:
   determining a minimum value for the input value;
   determining a maximum value for the input value;
   determining a saturation value for the input value; and
   deriving a new color value based on the minimum value, the maximum value, and the saturation value.

7. The method of claim 6, wherein identifying an achromatic value and a chromatic value further comprises accessing the achromatic curves and the chromatic curves using the minimum value.

8. A computer readable medium having computer executable instructions for performing the method of claim 1.

9. In a printing system that uses CMYK primaries, a method for controlling an amount of K primary added to the CMY primaries, the method comprising
   initializing a conversion engine with a first set of parameters for a chromatic region and a second set of parameters for an achromatic region;
   generating achromatic curves including an achromatic CMY curve and an achromatic K curve;
   generating chromatic curves including a chromatic CMY curve and a chromatic K curve; and
   computing a final CMYK value for a CMY value by computing a chromatic CMY value, a chromatic K value, an achromatic CMY value and an achromatic K value using the achromatic curves and the chromatic curves, wherein the CMY values are computed independently of the K values.

10. The method of claim 9, wherein the first set of parameters include a first curve type, a first start black value, and a first maximum black value and wherein the second set of parameters include a second curve type, a second start black value and a second maximum black value.

11. The method of claim 9, wherein a curve type of the chromatic K curve is inversely related to a curve type of the chromatic CMY curve.

12. The method of claim 9, wherein computing a final CMYK value for a CMY value further comprises determining a minimum value and a maximum value and determining a saturation value, wherein the saturation value is the difference of the maximum value and the minimum value divided by a difference between a maximum allowable colorant amount and the minimum value.

13. The method of claim 12, further comprising determining a chromatic value by subtracting the minimum value from the CMY value.

14. The method of claim 13, further comprising determining a new CMY value by multiplying the chromatic CMY value with the maximum allowed colorant and dividing by the difference between the maximum allowed colorant and the minimum value.

15. The method of claim 14, further comprising accessing the achromatic CMY and K curves and the chromatic CMY and K curves using the minimum value to determine chromatic and achromatic values.

16. The method of claim 15, further comprising computing interpolated CMY and K values.

17. The method of claim 16, further comprising determining final CMY and K values by adding the chromatic and achromatic values with the interpolated CMY and K values.

18. The method of claim 17, wherein the final CMY and K values are determining independently.

19. A computer readable medium having computer executable instructions for performing the method of claim 9.

20. A method for black generation in a CMYK printing system, the method comprising:
   generating achromatic curves and chromatic curves based on input parameters, wherein an addition of black and setting of an achromatic CMY gray value in an achromatic region of a gamut of the CMYK system is controlled by the achromatic curves separately from an addition of black and setting of a chromatic CMY gray value in a chromatic region of the gamut, the addition of black and setting of the chromatic CMY gray value in the chromatic region controlled by the chromatic curves;
   determining a minimum CMY value and a maximum CMY value from an input CMY value;
   determining a chromatic CMY value from the input CMY value and the minimum CMY value;

determining a saturation value for the input CMY value; and identifying a final CMY value by interpolating the final CMY value based on the saturation value and output values from the achromatic curves and the chromatic curves, wherein the output values are identified by accessing CMY values from the achromatic curves and the chromatic curves using the minimum CMY value.

21. The method of claim 20, wherein determining a chromatic CMY value further comprises scaling the chromatic CMY value.

22. The method of claim 21, wherein interpolating the final CMY value further comprises:
rescaling the scaled chromatic CMY value; and
combining the rescaled chromatic CMY value with the interpolated CMY value.

23. The method of claim 20, wherein the input parameters include at least one start black value, at least one maximum black value and at least one curve type, wherein the achromatic curves and the chromatic curves are defined by the input parameters.

* * * * *